United States Patent
Choi et al.

(10) Patent No.: US 9,811,648 B2
(45) Date of Patent: Nov. 7, 2017

(54) WEARABLE DEVICE PERFORMING USER AUTHENTICATION USING BIO-SIGNALS AND AUTHENTICATION METHOD OF THE SAME

(71) Applicant: SAMSUNG ELECTRONICS CO., LTD., Suwon-si (KR)

(72) Inventors: Chang Mok Choi, Seoul (KR); Sang Joon Kim, Hwaseong-si (KR); Seung Keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/199,481

(22) Filed: Mar. 6, 2014

(65) Prior Publication Data

US 2015/0074797 A1 Mar. 12, 2015

(30) Foreign Application Priority Data

Sep. 9, 2013 (KR) .................. 10-2013-0107833

(51) Int. Cl.
*G06F 21/32* (2013.01)
*H04W 12/06* (2009.01)
(Continued)

(52) U.S. Cl.
CPC ............ *G06F 21/32* (2013.01); *H04W 12/06* (2013.01); *G06F 3/017* (2013.01); *G06F 21/31* (2013.01);
(Continued)

(58) Field of Classification Search
CPC ........ H04N 21/44218; G06Q 20/40145; H04L 63/0861; G06F 21/32; G06F 3/017; G06F 21/31; H04W 12/06
(Continued)

(56) References Cited

U.S. PATENT DOCUMENTS

| 6,720,860 B1 | 4/2004 | Narayanaswami |
| 8,922,481 B1* | 12/2014 | Kauffmann ............. G09G 5/00 345/156 |

(Continued)

FOREIGN PATENT DOCUMENTS

| EP | 2 385 450 A1 | 9/2011 |
| KR | 20-0120590 Y1 | 8/1998 |

(Continued)

OTHER PUBLICATIONS

Zhang Xu et al., Hand Gesture Recognition and Virtual Game Control Based on 3D Accelerometer and EMG Sensors, Feb. 11, 2009, IUI'09, pp. 401-405.*

(Continued)

*Primary Examiner* — Carl Colin
*Assistant Examiner* — Gary Lavelle
(74) *Attorney, Agent, or Firm* — NSIP Law

(57) ABSTRACT

A wearable device includes a first sensor configured to detect a first biosignal generated in response to a gesture performed by a user, and a second sensor configured to detect a second biosignal of the user. The device further includes a memory configured to store, with respect to at least one user, information of the first biosignal and the second biosignal, and a processor configured to initiate user authentication based on a result of determining whether the detected first biosignal corresponds to the stored information, and authenticate the user by comparing the detected second biosignal to the stored information.

26 Claims, 8 Drawing Sheets

(51) Int. Cl.
    *G06Q 20/40*         (2012.01)
    *G06F 21/31*         (2013.01)
    *H04N 21/442*      (2011.01)
    *G06F 3/01*          (2006.01)
    *H04L 29/06*       (2006.01)

(52) U.S. Cl.
    CPC .... *G06Q 20/40145* (2013.01); *H04L 63/0861* (2013.01); *H04N 21/44218* (2013.01)

(58) Field of Classification Search
    USPC .......................................................... 726/19
    See application file for complete search history.

(56) References Cited

U.S. PATENT DOCUMENTS

| | | | |
|---|---|---|---|
| 2002/0089412 A1* | 7/2002 | Heger .................... | G06F 3/017 340/5.82 |
| 2004/0056907 A1* | 3/2004 | Sharma et al. ............... | 345/863 |
| 2005/0071647 A1* | 3/2005 | Fujinuma et al. ............ | 713/186 |
| 2005/0278750 A1* | 12/2005 | Grossman et al. .............. | 725/62 |
| 2006/0093208 A1* | 5/2006 | Li et al. ......................... | 382/159 |
| 2006/0215883 A1* | 9/2006 | Kim et al. ..................... | 382/115 |
| 2007/0055133 A1 | 3/2007 | Lim | |
| 2008/0134317 A1* | 6/2008 | Boss et al. ...................... | 726/18 |
| 2008/0216171 A1* | 9/2008 | Sano ......................... | H04L 9/32 726/19 |
| 2009/0029739 A1 | 1/2009 | Okamoto et al. | |
| 2010/0331649 A1 | 12/2010 | Chou | |
| 2011/0001607 A1* | 1/2011 | Kamakura ................... | 340/5.82 |
| 2011/0260830 A1* | 10/2011 | Weising ....................... | 340/5.52 |
| 2011/0282785 A1* | 11/2011 | Chin .................... | G06F 3/04883 705/42 |
| 2012/0007713 A1* | 1/2012 | Nasiri et al. ................. | 340/5.81 |
| 2012/0224611 A1* | 9/2012 | Baheti ..................... | H03M 7/30 375/219 |
| 2013/0159705 A1 | 6/2013 | Leedom, Jr. | |
| 2013/0227651 A1* | 8/2013 | Schultz ................... | G06F 21/32 726/4 |
| 2013/0265229 A1* | 10/2013 | Forutanpour ........... | G06F 3/014 345/158 |

FOREIGN PATENT DOCUMENTS

| | | |
|---|---|---|
| KR | 10-2007-0114541 A | 12/2007 |
| KR | 10-2009-0030105 A | 3/2009 |
| KR | 10-2009-0061179 A | 6/2009 |
| KR | 10-2009-0099147 A | 9/2009 |
| KR | 10-2010-0011562 A | 2/2010 |
| KR | 10-2010-0076136 A | 7/2010 |
| KR | 10-2011-0072427 A | 6/2011 |
| KR | 10-2011-0079161 A | 7/2011 |
| KR | 10-2012-0122587 A | 11/2012 |
| WO | WO 2008/084033 A1 | 7/2008 |

OTHER PUBLICATIONS

Fatemian et al. "HeartID: Cardiac biometric recognition." Biometrics: Theory Applications and Systems (BTAS), ourth IEEE International Conference on. IEEE, 2010 (5 pages in English).

Grosse et al. "Authentication at scale." Security & Privacy, IEEE 11.1 (2013): 15-22.

Li et al. "Mobile security: a look ahead." Security & Privacy, IEEE 11.1 (2013): 78-81.

International Search Report mailed Jun. 2, 2014 in counterpart International Application No. PCT/KR2014/001414 (3 pages, in English).

Extended European Search Report issued Jan. 20, 2017 in corresponding European Patent Application No. 14842116.7 (7 pages).

* cited by examiner

FIG. 1
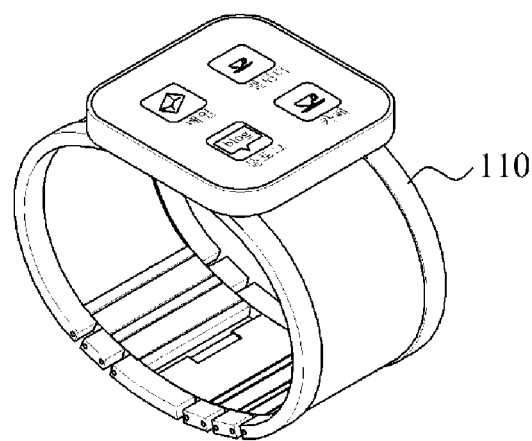
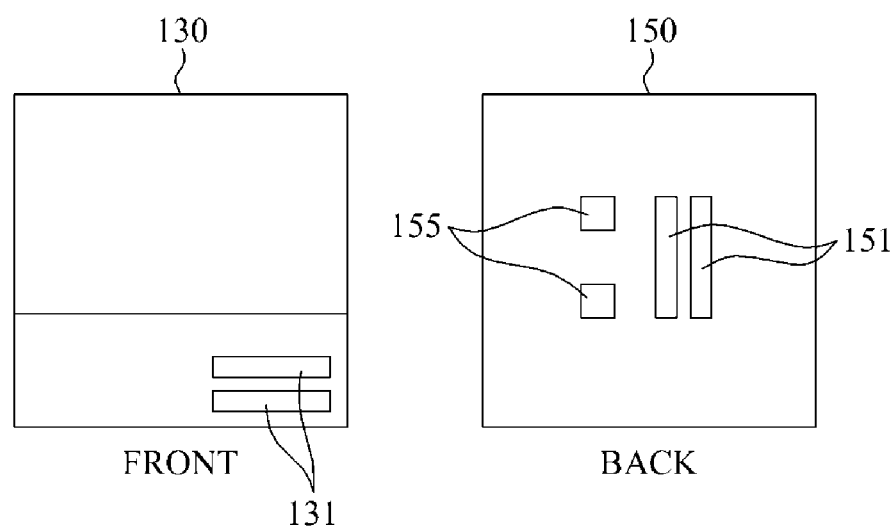

FIG. 8

| FUNCTION | COMMAND CODE FOR EXECUTION | ACCESS RIGHT INFORMATION |
|---|---|---|
| FINANCIAL TASK | #00001 | LEVEL : 4 |
| PERSONAL EMAIL | #00011 | LEVEL : 4 |
| INTERNET | #00111 | LEVEL : 3 |
| SMS | #01111 | LEVEL : 3 |
| CLOCK | #11111 | LEVEL : 0 (BASIC FUNCTION) |
| WEATHER INFORMATION | #11110 | LEVEL : 0 (BASIC FUNCTION) |
| | | |

WEARABLE DEVICE PERFORMING USER AUTHENTICATION USING BIO-SIGNALS AND AUTHENTICATION METHOD OF THE SAME

CROSS-REFERENCE TO RELATED APPLICATION

This application claims the benefit under 35 USC 119(a) of Korean Patent Application No. 10-2013-0107833, filed on Sep. 9, 2013, in the Korean Intellectual Property Office, the entire disclosure of which is incorporated herein by reference for all purposes.

BACKGROUND

1. Field

The following description relates to a wearable device performing user authentication using biosignals and an authentication method of the wearable device.

2. Description of Related Art

Amid the proliferation of smart phones, a variety of mobile devices are being developed, and a wearable type mobile device has been emerging. A mobile device may provide a great deal of convenience for modern life. A growing computing power of the mobile device may enable users to handle tasks previously performed using a personal computer (PC). However, due to widespread use of the mobile device, protecting personal information stored on the mobile device, such as, contact information, personal multimedia contents, for example, photos and videos, messages, and financial information has become more important. In a case in which a user loses a mobile device and another unspecified user uses the mobile device, there is a high risk of personal information of the user being unintentionally exposed. Accordingly, there is a desire for a method of authenticating a user for whom use of a mobile device is intended and controlling an access to various types of personal information stored on the mobile device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter In one general aspect, there is provided a wearable device, including a first sensor configured to detect a first biosignal generated in response to a gesture performed by a user, and a second sensor configured to detect a second biosignal of the user. The device further includes a memory configured to store, with respect to at least one user, information of the first biosignal and the second biosignal, and a processor configured to initiate user authentication based on a result of determining whether the detected first biosignal corresponds to the stored information, and authenticate the user by comparing the detected second biosignal to the stored information.

The first biosignal may be generated in response to a muscle movement performed by the user to input the gesture.

The first biosignal may be at least one of an electromyogram (EMG) signal generated before and after the muscle movement, a light signal penetrating a muscle of the user, and a force signal generated by the muscle.

The second biosignal may be at least one of an electrocardiogram (ECG) signal, a photoplethysmogram (PPG) signal, a voice of the user, and an impedance signal generated by a body of the user.

The stored information may include a piece of feature point information obtained by performing signal processing on the first biosignal and the second biosignal.

The stored information may be encoded.

The processor may be configured to determine whether a difference between the detected second biosignal and the stored information is within a predetermined error range, and authenticate the user based on a result of the determining of whether the difference is within the predetermined error range.

The device may further include an initial authenticator configured to receive the gesture and the second biosignal from the user, and store, in the memory, the first biosignal corresponding to the gesture, and the second biosignal.

The memory may be further configured to store access right information of a function executable in the wearable device, and in response a command to execute the function being input to the wearable device by the user, the processor may be configured to read, from the memory, the access right information, and provide, to the user, at least one of a visual feedback, an auditory feedback, and a tactile feedback based on the access right information.

The feedback may be a request for the user authentication.

The device may further include a wearing detection sensor configured to detect whether the wearable device is detached from the user, and the processor may be configured to control the user authentication to be invalid in response to the wearable device being detected to be detached from the user.

The wearing detection sensor may be configured to detect a mechanical movement of a band attached to a portion of a body of the user, and/or detect an electrical signal generated by attaching and detaching of the band.

The memory may be further configured to store device setting information of the at least one user, and in response to the user being authenticated, the processor may be further configured to read, from the memory, the device setting information of the authenticated user, and provide, to the user, a user interface based on the device setting information.

The wearable device may be a watch-type smartphone.

In another general aspect, there is provided a wearable device, including a first sensor configured to detect a first biosignal generated in response to a muscle movement performed by a user to input a gesture, and a second sensor configured to detect a second biosignal of the user, the second biosignal being at least one of an electrocardiogram (ECG) signal, a photoplethysmogram (PPG) signal, a voice of the user, and an impedance signal generated by a body of the user. The device further includes a memory configured to store, with respect to at least one user, information of the first biosignal and the second biosignal, and a processor configured to trigger user authentication based on a result of determining whether the detected first biosignal corresponds to the stored information, and authenticate the user by comparing the detected second biosignal to the stored information.

In still another general aspect, there is provided a user authentication method of a wearable device, the method including detecting a first biosignal generated in response to a gesture performed by a user, and detecting a second biosignal of the user. The method further includes storing, with respect to at least one user, information of the first biosignal and the second biosignal, initiating user authentication based on a result of determining whether the detected first biosignal corresponds to the stored information, and authenticating the user by comparing the detected second biosignal to the stored information.

The authenticating may include determining whether a difference between the detected second biosignal and the stored information is within a predetermined error range, and authenticating the user based on a result of the determining of whether the difference is within the predetermined error range.

The method may further include receiving the gesture and the second biosignal from the user, and storing the first biosignal corresponding to the gesture, and the second biosignal.

The method may further include storing access right information of a function executable in the wearable device. In response a command to execute the function being input to the wearable device by the user, the initiating may include reading the access right information, and providing, to the user, at least one of a visual feedback, an auditory feedback, and a tactile feedback based on the access right information.

The method may further include detecting whether the wearable device is detached from the user, and controlling the user authentication to be invalid in response to the wearable device being detected to be detached from the user.

The detecting may include detecting a mechanical movement of a band attached to a portion of a body of the user, and/or detecting an electrical signal generated by attaching and detaching of the band.

The method may further include storing device setting information of the at least one user, and in response to the user being authenticated, reading the device setting information of the authenticated user, and providing, to the user, a user interface based on the device setting information.

A non-transitory computer-readable storage medium may store a program including instructions to cause a computer to perform the method.

In yet another general aspect, there is provided a wearable device, including a first sensor configured to detect a first signal of a user, and a second sensor configured to detect a second signal of the user. The device further includes a processor configured to initiate user authentication in response to the detected first signal corresponding to information of the first signal, and authenticate the user in response to the detected second signal being within a predetermined range of information of the second signal.

The information of the first and second signals may be predetermined.

The processor may be further configured to receive, from the user, a command to execute a function, and provide, to the user, a feedback based on predetermined access right information corresponding to the function, the predetermined access right information indicating a level of the user authentication needed.

Other features and aspects will be apparent from the following detailed description, the drawings, and the claims.

BRIEF DESCRIPTION OF THE DRAWINGS

FIG. 1 is a diagram illustrating an example of a wearable device.

FIG. 8 is a diagram illustrating an example of access right information on executable functions, which are stored in a memory of a wearable device.

Figure 2:
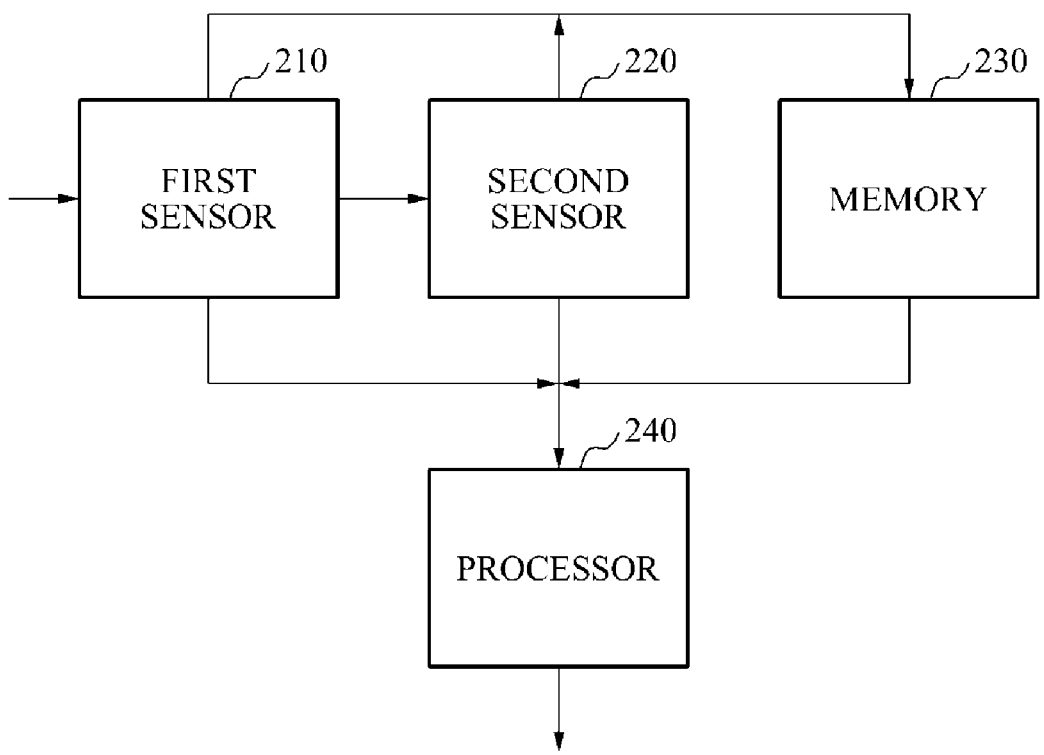
FIG. 2 is a block diagram illustrating an example of a wearable device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a wearable device. Referring to FIG. 1, the wearable device may be attachable to, wearable on, and detachable from a portion of a body of a user, using an arm band, a wrist band, and/or other fixing devices known to one of ordinary skill in the art.

For convenience of description, a surface of the wearable device that is provided with a display visible to the user, for example, a touch display, will be described as a front 130, and another surface of the wearable device that faces the body of the user when the wearable device is attached or worn will be described as a back 150. Based on a design of the wearable device, a mechanically or electrically openable and closeable protector may be disposed on the front 130 to protect the display. In this example, the front 130 may refer to, for example, the surface of the actual display or a surface of the protector, on which a sensor to be described later is provided.

The wearable device includes a plurality of sensors 131, 151, and 155 provided on the front 130 and the back 150, respectively. The wearable device detects, using at least one of the sensors 131, 151, and 155, a trigger signal triggering a process of user authentication, and initiates the user authentication based on the detected trigger signal.

The user may generate the trigger signal by performing a predetermined gesture, for example, opening a hand, clenching a fist, rotating a wrist, and/or other gestures known to one of ordinary skill in the art. The wearable device may detect, using at least one of the sensors 131, 151, and 155, the trigger signal generated in response to the gesture. When the trigger signal is detected, the wearable device may initiate the process of the user authentication. According to an example, the gesture may be intentionally inputted by the user while the user is wearing the wearable device, although the gesture may not be performed by the user in a process of putting on the wearable device.

When the user performs the gesture while the user is wearing the wearable device, the sensor 155 provided on the back 150 of the wearable device may detect a biosignal generated in response to a muscle movement of the user, which is generated by the gesture. The biosignal generated in response to the gesture performed by the user may be the trigger signal used to initiate the user authentication, and be referred to as a first biosignal. The first biosignal may include, for example, an electromyogram (EMG) signal generated before and after the muscle movement of the user, a light signal penetrating a muscle of the user, and/or a force signal generated by the muscle of the user. The first biosignal may be generated only in response to a predetermined gesture input from the user.

When the process of user authentication with respect to the user is initiated by the first biosignal detected by the sensor 155 provided on the back 150 of the wearable device, the wearable device may authenticate the user, using a second biosignal detected by the sensor 131 provided on the front 130 and/or the sensor 151 provided on the back 150. The second biosignal may be unique to each user, and be distinguished from the first biosignal. The second biosignal may include, for example, an electrocardiogram (ECG) signal, a photoplethysmogram (PPG) signal, a voice of the user, and/or an impedance signal generated by a body of the user. Based on implementation, the second biosignal may be unique to each user, and thus, recognizing an iris or a fingerprint may be used to obtain the second biosignal.

As shown in FIG. 1, the wearable device may be a watch-type smartphone 110. The watch-type smartphone 110 may be an example of the wearable device, and thus, it may be obvious to those skilled in the art that various applications and design modifications may be possible. Described hereinafter is an example of an operation of the wearable device used when the user wears the wearable device around a left wrist.

The user wearing the wearable device around the left wrist may perform a predetermined gesture, for example, opening a left hand and/or rotating the left hand upwards. Due to the gesture, a first biosignal, as a trigger signal, may be generated, and the wearable device may detect the first biosignal. The wearable device may initiate a process of user authentication in response to the detecting of the first biosignal. The detecting of the first biosignal and the initiating of the process of user authentication may be performed inconsecutively or consecutively in terms of time based on implementation.

According to an example, the first biosignal generated in response to a muscle movement of the user, due to the gesture, may be detected by the sensor 155 provided on the back 150 of the wearable device. The first biosignal detected by the sensor 155 may be compared to a trigger signal stored in a memory of the wearable device and predetermined by the user. As a result of the comparison, when the first biosignal is determined to be identical to the trigger signal or within a predetermined error range of the trigger signal, the process of user authentication may be initiated.

After the process of user authentication is initiated, the user may place a finger of a right hand on the sensor 131 provided on the front 130 of the wearable device, and the wearable device may detect a second biosignal of the user, using the sensor 131. The sensor 151 provided on the back 150 of the wearable device and in contact with skin of the user may also detect the second biosignal in the same way as the sensor 131 provided on the front 130. For example, the sensor 155 may detect an EMG signal of the user, and the sensor 131 and the sensor 151 may detect an ECG signal of the user.

To detect the ECG signal as an example of the second biosignal, a signal detected in at least two different portions of the body of the user may be needed, and thus, the sensors 131 and 151 are provided on the front 130 and on the back 150, respectively. In an example of detecting a biosignal unique to the user from a body part, for example, a voice of the user and/or an impedance signal generated by the body of the user, aside from the ECG signal, a sensor used to receive the second biosignal may be provided on either the front 130 or the back 150. A number of the sensors used to detect the first biosignal and the second biosignal may vary based on need.

FIG. 2 is a block diagram illustrating an example of a wearable device 200. Referring to FIG. 2, the wearable device 200 may include a first sensor 210, a second sensor 220, a memory 230, and a processor 240.

The first sensor 210 detects a first biosignal generated in response to a gesture performed by a user. The first biosignal may be generated in response to a muscle movement of the user to input the gesture. The first biosignal may include, for example, an EMG signal generated before and after the muscle movement of the user, a light signal penetrating a muscle of the user, and/or a force signal generated by the muscle of the user.

The gesture performed by the user may be one of various forms, for example, a wrist rotating, a hand flailing, and/or a first clenching, which may be performed by the user using a portion of a body on which the user wears the wearable device 200. When a higher level of user authentication is needed based on implementation, at least two gestures consecutively input by the user may initiate the user authentication.

The second sensor 220 detects a second biosignal of the user. The second biosignal may include, for example, an ECG signal, a PPG signal, a voice of the user, and/or an impedance signal generated by the body of the user.

The memory 230 stores, with respect to at least one user, information directly or indirectly representing the first biosignal and the second biosignal. For example, when sampling the first biosignal and the second biosignal, the information directly representing the first biosignal and the second biosignal may be information representing at least a portion of a sampled data symbol, or may be a duplicated signal of the first biosignal and the second signal. The information indirectly representing the first biosignal and the second biosignal may be information in which the first biosignal and the second biosignal are processed and represented based on various signal processing methods.

The memory 230 may store at least one piece of feature point information obtained through signal processing performed on the first biosignal and the second biosignal. The information to be stored in the memory 230 may be encoded and stored in the memory 230.

Based on implementation, in an example of irregular access to the stored information, a design to prevent the stored information from being leaked out may be applied. When the user loses the wearable device 200, various methods may be adopted to prevent a third person from decoding the stored information in an abnormal manner.

The processor 240 determines, by referring to the memory 230, whether the first biosignal detected by the first sensor 210 corresponds to the information stored in the memory 230, and initiates a process of user authentication when the first biosignal corresponds to the stored information. The processor 240 authenticates the user by comparing the second biosignal detected by the second sensor 220 to the information stored in the memory 230. When comparing the second biosignal detected by the second sensor 220 to the information stored in the memory 230, the processor 240 may operate based on a predetermined error range. The error range may be determined by the user or predetermined in the wearable device 200 based on a result of statistics. For example, the error range may be predetermined, by the user, to be 7%.

When a 5% error occurs as a result of comparing the second biosignal detected by the second sensor 220 to the information stored in the memory 230, the processor 240 may determine that the second biosignal detected by the second sensor 220 corresponds to the information stored in the memory 230 because the 5% error is within the predetermined error range. In this example, the processor 240 may authenticate the user. When a 10% error occurs as a result of comparing the second biosignal detected by the second sensor 220 to the information stored in the memory 230, the processor 240 may determine that the second biosignal detected by the second sensor 220 does not correspond to the information stored in the memory 230 because the 10% error is outside the predetermined error range. In this example, the processor 240 may not authenticate the user. The processor 240 may notify the user of a result of the user authentication in a visual, audible, and/or tactile manner, for example, on a display of the wearable device 200, through a speaker of the wearable device 200, and/or through a vibration of the wearable device 200.

Figure 3:
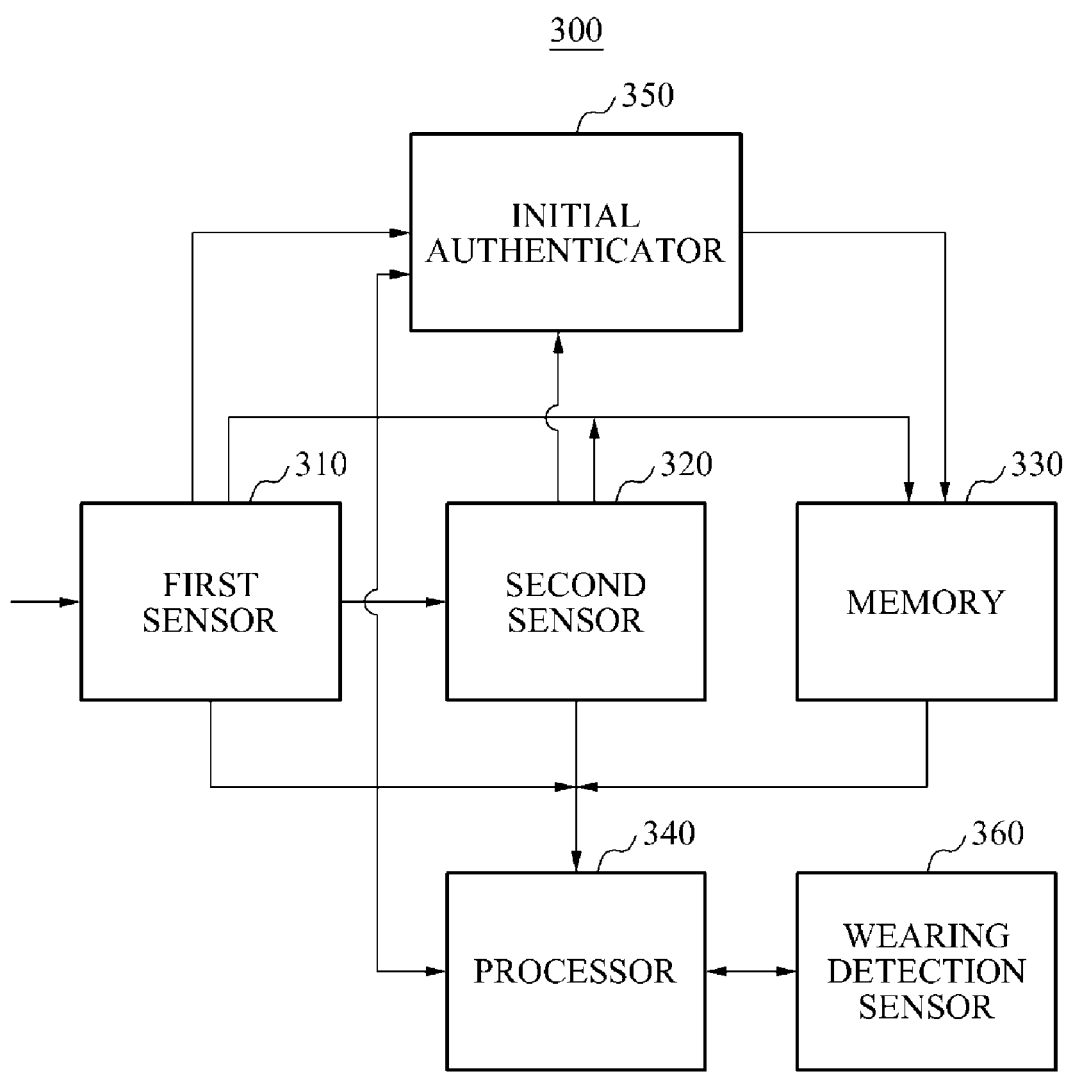
FIG. 3 is a block diagram illustrating another example of a wearable device.

FIG. 3 is a block diagram illustrating another example of a wearable device 300. Referring to FIG. 3, the wearable device 300 may include a first sensor 310, a second sensor 320, a memory 330, a processor 340, an initial authenticator 350, and a wearing detection sensor 360.

The memory 330 stores access right information on at least one function executable in the wearable device 300. The access right information on each function may be determined by an external device, for example, a personal computer (PC), a laptop computer, and/or a smartphone, which is connected to the wearable device 300 through a wire or a wireless communication, or may be self-determined by the wearable device 300. An example of the access right information on the executable function, which is stored in the memory 330, will be described in detail by referring to following FIG. 8.

When a command to execute a function is input to the wearable device 300 from the user, the processor 340 reads the access right information on the function, by referring to the memory 330, and provides at least one of a visual feedback, an auditory feedback, and a tactile feedback to the user based on the access right information. Each form of feedback may be a request for user authentication to the user.

The wearable device 300 may include various executable functions, for example, performing a financial task, smartphone banking, opening a personal e-mail, using the Internet, transmitting a short message service (SMS) message, and/or other executable functions known to one of ordinary skill in the art, and each function may need a different access right. The memory 330 may store the access right information on the various functions executable in the wearable device 300. For example, functions such as smartphone banking and opening a personal e-mail may need a relatively high level of the access right information, and functions such as using the Internet and transmitting an SMS message may need a relatively low level of the access right information.

For example, when the user inputs a command to execute the function of opening a personal e-mail, the processor 340 may read the access right information on the function, by referring to the memory 330. The access right information on the function of opening a personal e-mail that is stored in the memory 330, may be at a relatively high level. The processor 340 may provide, to the user, at least one of a visual feedback, an auditory feedback, and a tactile feedback requesting a high level of user authentication based on the access right information. For example, the visual feedback may be feedback indicated on a display of the wearable device 300, the auditory feedback may be feedback delivered in a form of sound to the user through a speaker of the wearable device 300, and the tactile feedback may be feedback delivered in a form of touch sensation to the user through vibration of the wearable device 300.

The initial authenticator 350 receives a gesture and/or a first biosignal and a second biosignal from the user through the first sensor 310 and the second sensor 320, respectively, to set up an initial authentication. The initial authenticator 350 stores, in the memory 330, the first biosignal corresponding to the input gesture and the second biosignal.

The wearing detection sensor 360 detects whether the wearable device 300 is detached from the user. The wearing detection sensor 360 may detect a mechanical movement of a band attached to a portion of a body of the user, by being connected to the wearable device 300, or may detect an electrical signal generated in association with attaching and detaching of the band.

The wearing detection sensor 360 may detect, by being connected to the wearable device 300, changes generated when the band attached to the portion of the body of the user is attached and detached. For example, the wearing detection sensor 360 may detect a change in which tension or elasticity of the band attached to a wrist of the user increases or decreases. Also, the wearing detection sensor 360 may detect a change in an amount of light detected by a light receiving unit of a photo sensor attached to a back of the wearable device 300, and may detect a change in which an electrical signal or an impedance signal is intensified or weakened when a contact point between the wearing detection sensor 360 and a skin appears or disappears due to the attaching or detaching of the band. Further, the wearing detection sensor 360 may include various sensors that may detect whether the wearable device 300 is worn or not, and may deliver changes detected by the sensors to the processor 340.

The processor 340 controls the user authentication to be invalid based on a signal received from the wearing detection sensor 360. For example, the signal received from the wearing detection sensor 360 may be a signal such as "the user authentication to be invalid" indicating that a usage right assigned to the user through the process of the user authentication that is performed when the user wears the wearable device 300 is withdrawn or nullified. When the user authentication is invalid, the user may need to obtain the usage right through the process of the user authentication that is performed again when the user resumes wearing the wearable device 300.

The memory 330 may further store device setting information on each of at least one user. When the user is authenticated, the processor 340 may read the device setting information on the authenticated user, by referring to the memory 330, and may provide a user interface based on the device setting information.

For example, different device setting information or different configuration information pertaining to user A and user B may be stored in the memory 330. When the authenticated user is the user A, the processor 340 may read the device setting information on the user A that is stored in the memory 330, and may provide a main display and/or an icon arrangement for application execution, for the user A.

Other operations of the first sensor 310, the second sensor 320, the memory 330, and the processor 340 of FIG. 3, which are not described in the foregoing, may be the same as the description of the first sensor 210, the second sensor 220, the memory 230, and the processor 340 of FIG. 2, respectively. Thus, a repeated detailed description of the related operations is omitted here for conciseness and ease of description.

Figure 4:
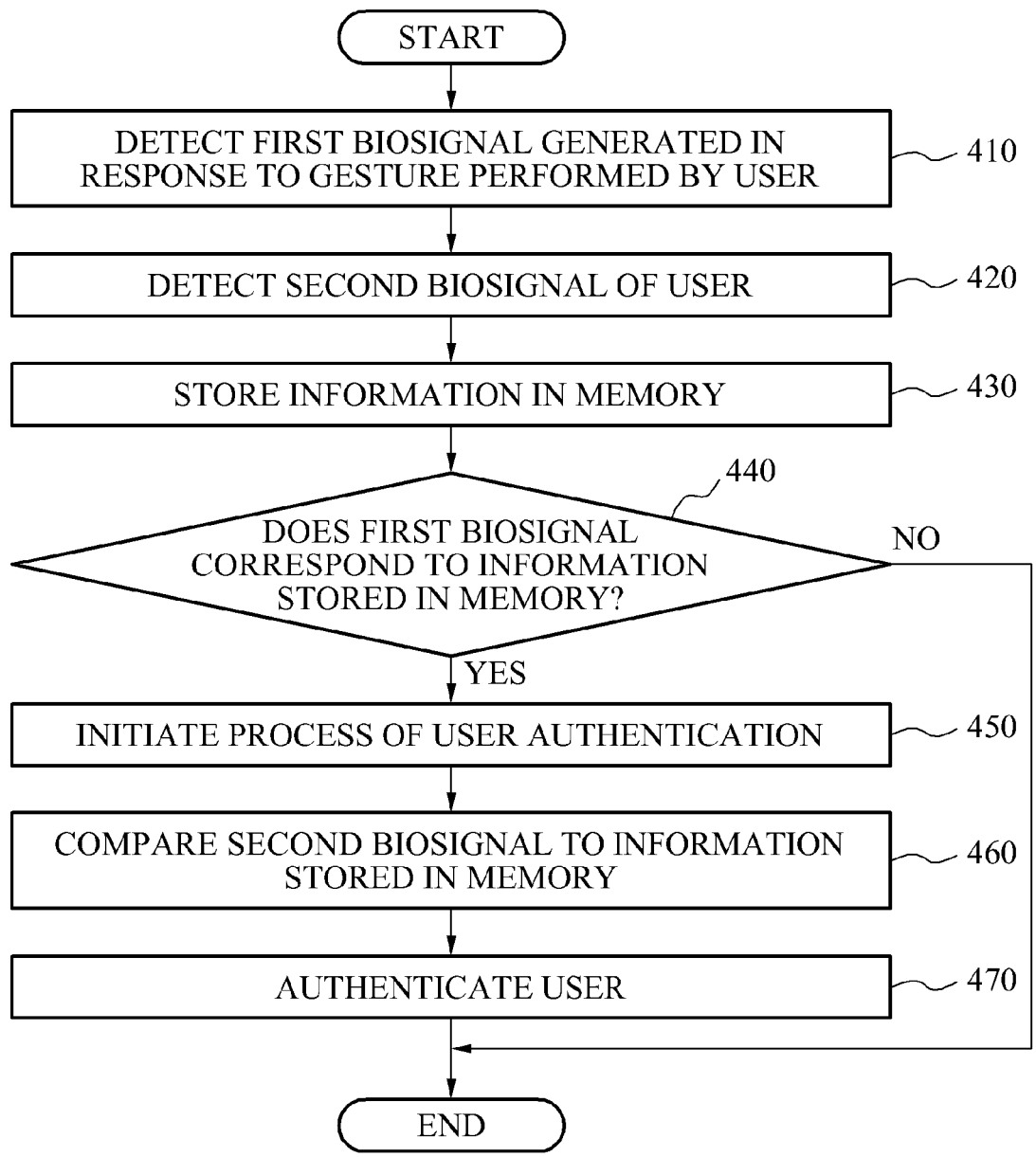
FIG. 4 is a flowchart illustrating an example of an authentication method of a wearable device.

FIG. 4 is a flowchart illustrating a user authentication method of a wearable device. Referring to FIG. 4, in operation 410, the wearable device detects a first biosignal generated in response to a gesture performed by a user. The first biosignal may be generated in response to a muscle movement of the user to input the gesture. The first biosignal may be at least one of an EMG signal generated before and after the muscle movement of the user, a light signal penetrating a muscle of the user, and a force signal generated by the muscle of the user.

In operation 420, the wearable device detects a second biosignal of the user. The second biosignal may be a signal distinguished from the first biosignal, and at least one of an ECG signal, a PPG signal, a voice of the user, and an impedance signal generated by a body of the user.

In operation 430, the wearable device stores, with respect to at least one user, information directly or indirectly representing the first biosignal and the second biosignal, in a memory of the wearable device.

In operation 440, the wearable device determines whether the first biosignal detected by the first sensor corresponds to the information stored in the memory. When the wearable device determines that the first biosignal corresponds to the stored information, the wearable device continues in operation 450. When the wearable device determines that the first biosignal does not correspond to the stored information, the wearable device ends the method.

In operation 450, the wearable device initiates a process of user authentication.

In operation 460, the wearable device compares the second biosignal detected by the second sensor to the stored information.

In operation 470, the wearable device authenticates the user based on a result of the comparison, e.g., when the second biosignal corresponds to the stored information.

When the user is authenticated, the wearable device may read device setting information of the authenticated user, by referring to the memory, and provide a user interface based on the device setting information. The device setting information on each of the at least one user may be stored in the memory of the wearable device.

Figure 5:
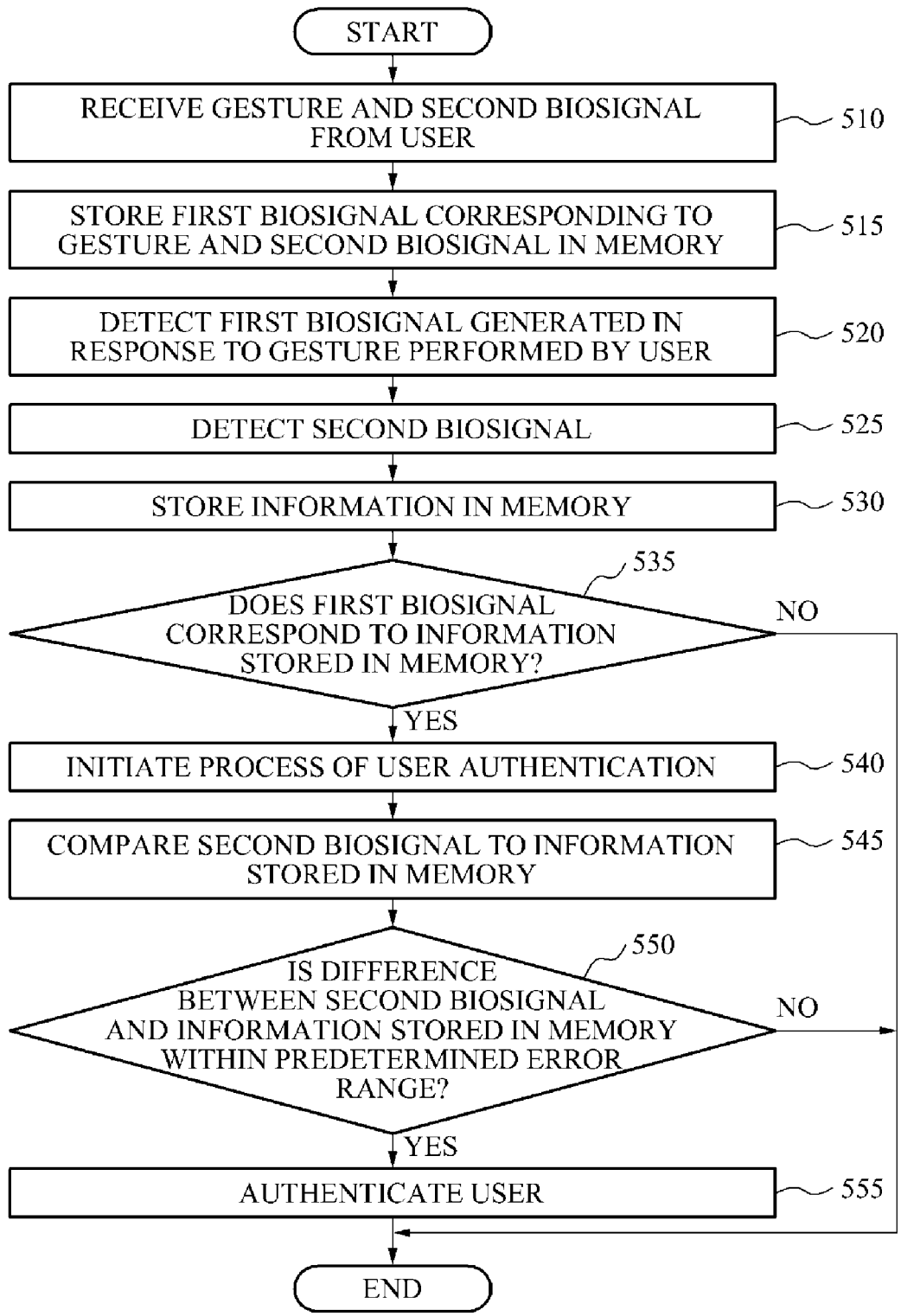
FIG. 5 is a flowchart illustrating another example of an authentication method of a wearable device.

FIG. 5 is a flowchart illustrating another example of a user authentication method of a wearable device. Referring to FIG. 5, in operation 510, the wearable device receives a gesture and a second biosignal from a user.

In operation 515, the wearable device stores, in a memory of the wearable device, a first biosignal corresponding to the gesture, and the second biosignal.

A process of storing initial user information is performed in operations 510 and 515, and thus, the user information stored in operations 510 and 515 may be used for user authentication in the wearable device. When two or more users use the wearable device, the information stored in operations 510 and 515 may be managed with respect to each of the users.

In operation 520, the wearable device detects the first biosignal generated in response to the gesture performed by the user. The first biosignal may be generated in response to a muscle movement of the user to input the gesture. The first biosignal may include, for example, an EMG signal generated before and after the muscle movement of the user, a light signal penetrating a muscle of the user, and/or a force signal generated by the muscle of the user.

In operation 525, the wearable device detects the second biosignal of the user. The second biosignal may be a biosignal unique to each of users and distinguished from the first biosignal, and may include, for example, an ECG signal, a PPG signal, a voice of the user, and/or an impedance signal generated by a body of the user.

In operation 530, the wearable device stores, with respect to at least one user, information directly or indirectly representing the first biosignal and the second biosignal, in the memory.

In operation 535, the wearable device determines whether the first biosignal detected by the first sensor corresponds to the information stored in the memory. When the wearable device determines that the first biosignal corresponds to the stored information, the wearable device continues in operation 540. When the wearable device determines that the first biosignal does not correspond to the stored information, the wearable device ends the method.

In operation 540, the wearable device initiates a process of user authentication.

In operation 545, the wearable device compares the second biosignal detected by the second sensor to the information stored in the memory.

In operation 550, the wearable device determines whether a difference between the second biosignal detected by the second sensor and the information stored in the memory is within a predetermined error range. When the wearable device determines that the difference between the second biosignal and the stored information is within the predetermined error range, the wearable device continues in operation 555. When the wearable device determines that the difference between the second biosignal and the stored information is outside the predetermined error range, the wearable device ends the method.

In operation 555, the wearable device authenticates the user.

When the wearable device determines that the difference between the second biosignal and the stored information is beyond the predetermined error range, the wearable device may provide basic information, such as time and day, to the user.

Figure 6:
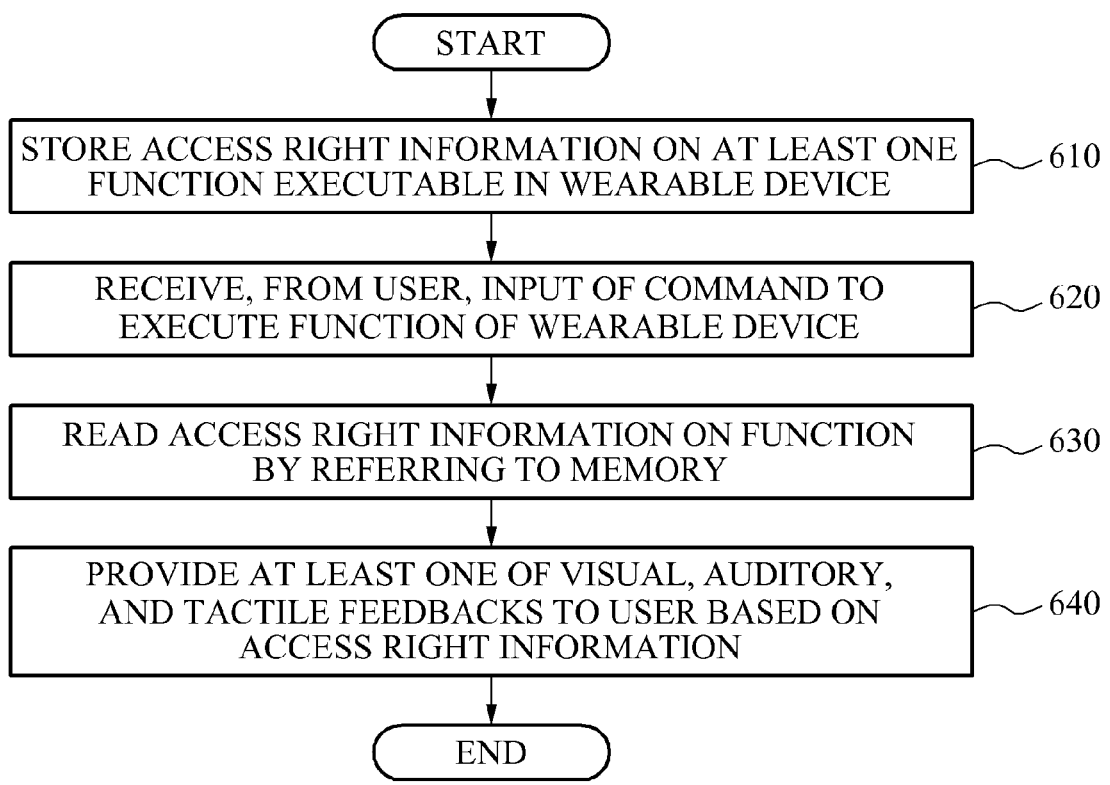
FIG. 6 is a flowchart illustrating an example of an authentication method used to provide different functions based on access right information of a user in a wearable device.

FIG. 6 is a flowchart illustrating an example of an authentication method used to provide different functions based on access right information of a user in a wearable device. Referring to FIG. 6, in operation 610, the wearable device stores the access right information on at least one function executable in the wearable device.

In operation 620, the wearable device receives, from the user, an input of a command to execute a function of the wearable device of the at least one function executable in the wearable device.

In operation 630, the wearable device reads, by referring to a memory of the wearable device, the access right information on the function for which the command to execute is input.

In operation 640, the wearable device provides at least one of a visual feedback, an auditory feedback, and a tactile feedback to the user based on the access right information. Each feedback may be a request sent to the user for authentication.

Figure 7:
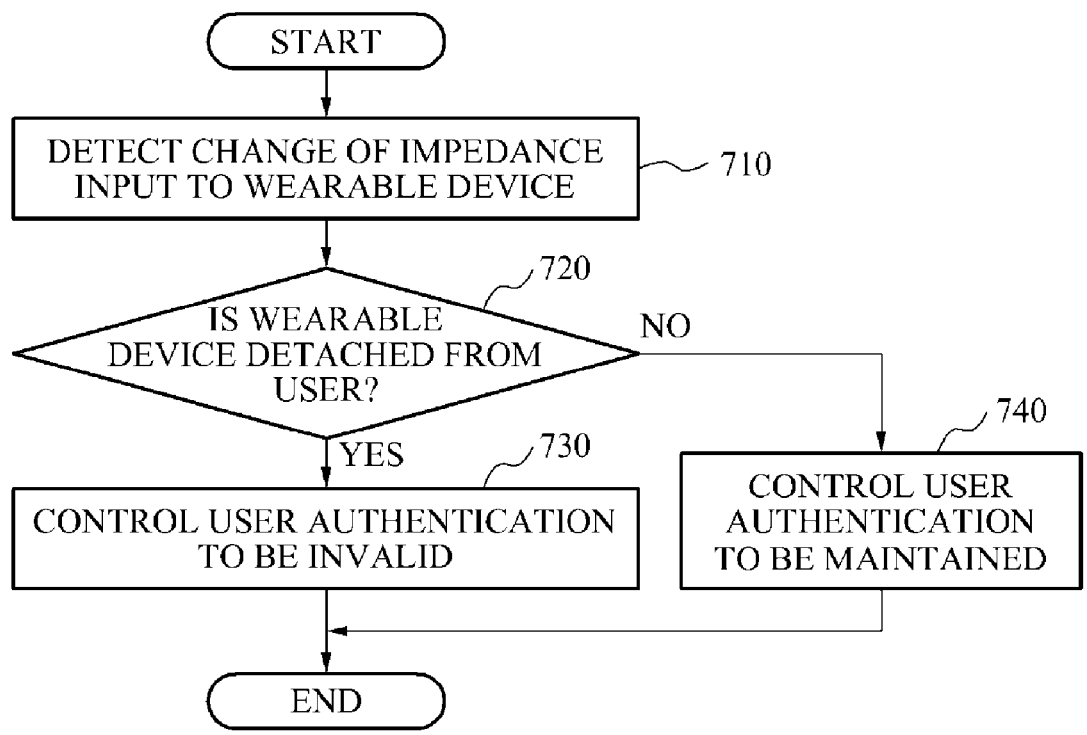
FIG. 7 is a flowchart illustrating an example of an operational method used when a wearable device is detached from a user.

FIG. 7 is a flowchart illustrating an example of an operational method used when a wearable device is detached from a user. Described hereinafter is an example in which a wearing detection sensor is provided with a sensor detecting a change of impedance.

Referring to FIG. 7, in operation 710, the wearable device detects, from the wearing detection sensor, the change of the impedance input to the wearable device.

In operation 720, the wearable device determines whether the wearable device is detached from the user based on the change of the impedance. When the wearable device determines that the wearable device is detached from the user, the wearable device continues in operation 730. When the wearable device determines that the wearable device is attached to the user, the wearable device continues in operation 740.

For example, when a value of the impedance input to the wearable device is greater than a predetermined level or is changed to be less than the predetermined level, the wearable device may determine that the wearable device is detached from the user. When a value of the impedance input to the wearable device remains at the predetermined level or is increased to be the predetermined level, the wearable device may determine that the wearable device is not detached from the user.

In operation 730, the wearable device controls user authentication to be invalid.

In operation 740, the wearable device controls the user authentication to be maintained.

According to another example, the wearing detection sensor may include a photo sensor detecting an amount of light collected on a back of the wearable device, or a sensor detecting tension of a band. In this example, the wearable device may determine whether the wearable device is detached from the user in a same or a similar manner as described, based on a characteristic of each sensor.

FIG. 8 is a diagram illustrating an example of access right information on executable functions, which are stored in a memory of a wearable device. Referring to FIG. 8, in the memory of the wearable device, the access right information on the executable functions may be stored along with a command code for execution of each of the executable functions, such as performing a financial task, smartphone banking, opening a personal e-mail, using the Internet, transmitting an SMS message, and providing time (clock) and weather information.

A different access right determined with respect to each of the executable functions may be stored in the memory. For example, the access right of level 4 may be determined for functions relating to important financial information and privacy protection such as performing a financial task, smartphone banking, and opening a personal e-mail. The access right of level 3 may be determined for functions such as using the Internet and transmitting an SMS message.

Also, the access right of level 0 may be determined for basic functions needing no security, such as, providing time or weather information. The functions for which the access right of level 0 is determined, may be provided even when a user does not undergo user authentication or fails the user authentication.

For example, when a command for execution is input from the user, a processor of the wearing device may verify, by referring to the memory, which function is related to the command based on an input command code for execution, and may read the access right information on the verified function. For example, when the input command code for execution is #00011, the processor may verify that the function is a function of opening a personal e-mail, and may read that the access right information on the verified function of opening a personal e-mail is of level 4. The processor may request, based on the access right information, for example, of level 4, an additional user authentication to the user, using a visual feedback, an auditory feedback, and/or a tactile feedback.

Described in the foregoing is the example in which the access right information on at the executable functions in the wearable device is stored in a form or order of a level of the access right. However, the access right information may be stored in other various forms or orders.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wearable device, comprising:
   a first sensor configured to detect a first biosignal generated inside a user's body in response to a muscle movement of the user to perform a gesture;
   a second sensor configured to detect a second biosignal of the user;
   a memory configured to store, with respect to the user, information of the first biosignal and the second biosignal; and
   a processor configured to:
      initiate user authentication based on determining whether the detected first biosignal corresponds to the stored information of the user, and
      authenticate the user by comparing the detected second biosignal to the stored information.

2. The device of claim 1, wherein the first biosignal comprises at least one of an electromyogram (EMG) signal generated before and after a muscle movement, a light signal penetrating a muscle of the user, or a force signal generated by a muscle of the user.

3. The device of claim 1, wherein the second biosignal is at least one of an electrocardiogram (ECG) signal, a photoplethysmogram (PPG) signal, a voice of the user, or an impedance signal generated by a body of the user.

4. The device of claim 1, wherein the processor is configured to:
determine whether a difference between the detected second biosignal and the stored information is within an error range; and
authenticate the user based on the determining that the difference is within the error range.

5. The device of claim 1, further comprising:
an initial authenticator configured to
receive the gesture and the second biosignal from the user; and
store, in the memory, the first biosignal corresponding to the gesture, and the second biosignal.

6. The device of claim 1, wherein the processor is further configured to:
receive a user input to execute a function of the wearable device;
retrieve an access right information particular to the function from the memory; and
request user authentication corresponding to the access right information.

7. The device of claim 1, further comprising:
a wearing detection sensor configured to detect whether the wearable device is detached from the user,
wherein the processor is configured to control the user authentication to be invalid in response to the wearable device being detected to be detached from the user.

8. The device of claim 7, wherein the wearing detection sensor is configured to:
detect a mechanical movement of a band attached to a portion of a body of the user; and/or
detect an electrical signal generated by attaching and detaching of the band.

9. The device of claim 1, wherein:
the memory is further configured to store device setting information of the user; and
in response to the user being authenticated, the processor is further configured to
read, from the memory, the device setting information of the authenticated user, and
provide, to the user, a user interface based on the device setting information.

10. The device of claim 1, wherein the wearable device is a watch-type smartphone.

11. The device of claim 1, wherein the first biosignal is based on a penetration of a light signal through a muscle of the user.

12. The device of claim 1, wherein the stored information is encoded and comprises a piece of feature point information obtained by performing signal processing on the first biosignal and the second biosignal.

13. A wearable device, comprising:
a first electromagnetic signal sensor configured to detect a first biosignal of an electrical activity generated inside a user's body in response to a muscle movement of the user to input a gesture;
a second sensor configured to detect a second biosignal of the user, the second biosignal being at least one of an electrocardiogram (ECG) signal, a photoplethysmogram (PPG) signal, a voice of the user, an impedance signal generated by a body of the user, a fingerprint, or an iris scan;
a memory configured to store, with respect to the user, information of the first biosignal and the second biosignal; and
a processor configured to:
trigger user authentication based on determining whether the detected first biosignal corresponds to the stored information of the user, and
authenticate the user by comparing the detected second biosignal to the stored information.

14. The device of claim 13, wherein the stored information is encoded and comprises a piece of feature point information obtained by performing signal processing on the first biosignal and the second biosignal.

15. A user authentication method of a wearable device, the method comprising:
detecting a first biosignal of an electrical activity inside a muscle of a user generated in response to a gesture performed by the user;
detecting a second biosignal of the user;
storing, with respect to the user, information of the first biosignal and the second biosignal;
proceeding without authentication in response to determining that the detected first biosignal does not correspond to the stored information of the user;
initiating user authentication based on determining that the detected first biosignal corresponds to the stored information of the user; and
authenticating the user by comparing the detected second biosignal to the stored information.

16. The method of claim 15, wherein the authenticating comprises:
determining whether a difference between the detected second biosignal and the stored information is within an error range; and
authenticating the user based on the determining that the difference is within the error range.

17. The method of claim 15, further comprising:
receiving the gesture and the second biosignal from the user; and
storing the first biosignal corresponding to the gesture, and the second biosignal.

18. The method of claim 15, further comprising:
storing access right information levels of functions executable in the wearable device,
wherein, in response to a command to execute the function being input to the wearable device by the user, the initiating comprises reading the access right information level corresponding to the command to execute, and providing, to the user, at least one of a visual feedback, an auditory feedback, or a tactile feedback based on the access right information level.

19. The method of claim 15, further comprising:
detecting whether the wearable device is detached from the user; and
controlling the user authentication to be invalid in response to the wearable device being detected to be detached from the user.

20. The method of claim 19, wherein the detecting comprises:
detecting a mechanical movement of a band attached to a portion of a body of the user; and/or
detecting an electrical signal generated by attaching and detaching of the band.

21. The method of claim 15, further comprising:
storing device setting information of the user; and
in response to the user being authenticated, reading the device setting information of the authenticated user, and providing, to the user, a user interface based on the device setting information.

22. A non-transitory computer-readable storage medium storing a program comprising instructions to cause a computer to perform a method comprising:
detecting a first biosignal of an electrical activity inside a muscle of a user generated in response to a gesture performed by the user;
detecting a second biosignal of the user;
storing, with respect to the user, information of the first biosignal and the second biosignal;
after detecting the first biosignal and detecting the second biosignal, determining whether the detected first biosignal corresponds to the stored information,
proceeding without authentication in response to determining that the detected first biosignal does not correspond to the stored information of the user;
initiating user authentication based on determining that the detected first biosignal corresponds to the stored information of the user; and
authenticating the user by comparing the detected second biosignal to the stored information.

23. The method of claim 15, wherein the stored information is encoded and comprises a piece of feature point information obtained by performing signal processing on the first biosignal and the second biosignal.

24. A wearable device, comprising:
a first sensor configured to detect a first biosignal generated inside a user's body in response to a muscle movement of the user to perform a gesture;
a second sensor configured to detect a second biosignal of the user;
a memory configured to store information of the first biosignal and the second biosignal; and
a processor configured to:
initiate user authentication in response to the detected first biosignal being determined to correspond to information of the first biosignal, and
authenticate the user in response to the detected second biosignal being determined to be within a range of information of the second signal,
wherein the information of the first biosignal and the information of the second biosignal is encoded and comprises a piece of feature point information obtained by performing signal processing on the first biosignal and the second biosignal.

25. The wearable device of claim 24, wherein the information of the first and second signals are predetermined.

26. The wearable device of claim 24, wherein the processor is further configured to:
receive, from the user, a command to execute a function; and
provide, to the user, a feedback based on access right information corresponding to the function, the access right information indicating a level of the user authentication needed.

* * * * *